June 11, 1946.  W. F. MELLEN ET AL  2,401,837
PLOW WITH SINGLE COLTER
Filed April 10, 1944   2 Sheets-Sheet 1

INVENTORS
WILLIAM F. MELLEN
JOHN H. CLASEN
BY HARRIS, KIECH, FOSTER & HARRIS
FOR THE FIRM
ATTORNEYS

June 11, 1946.　　W. F. MELLEN ET AL　　2,401,837
PLOW WITH SINGLE COLTER
Filed April 10, 1944　　2 Sheets-Sheet 2

INVENTORS
WILLIAM F. MELLEN
JOHN H. CLASEN
BY HARRIS, KIECH, FOSTER & HARRIS
ATTORNEYS

Patented June 11, 1946

2,401,837

UNITED STATES PATENT OFFICE 2,401,837

PLOW WITH SINGLE COLTER

William Fisk Mellen, Whittier, and John H. Clasen, Anaheim, Calif., assignors, by direct and mesne assignments, of one-half to said Mellen and one-half to Harry Rogers, Bakersfield, Calif.

Application April 10, 1944, Serial No. 530,300

12 Claims. (Cl. 97—86)

This invention relates to plowing structures, and particularly to plows adapted to be drawn by powered vehicles such as tractors, as where plows are mounted thereon so as to be movable to and from operative positions.

A general object of the invention is to improve the efficiency of plowing operations. Another object is to provide a two-way plow structure wherein two plow members are mounted for selective movement to and from their operative positions and cooperate with auxiliary soil penetrating means adapted to facilitate plowing operations. A particular object of the invention is to provide a plow structure adapted to be carried by a tractor or the like wherein two oppositely pitched plow members adapted to be selectively raised and lowered from and to operative position are so associated with an auxiliary cultivating device, such as a colter, as to shift the auxiliary device automatically from position to cooperate with one plow member into a position to cooperate with the other plow member when the one plow member is moved from operative position and the other plow member is moved into its operative position. One feature of the invention resides in providing a colter on a mounting by which it may be shifted from one side to the other automatically as, for example, by a cam-type of action when the two plow members are selectively raised and lowered. Another feature of invention is founded in means for adjusting the colter with respect to its operative positions.

Another feature of invention resides in connecting the two plow members, whereby one plow may be simultaneously raised when one is lowered, and one may be automatically lifted from operative position, even while the other remains in its previous inoperative position, when the whole plow structure is bodily elevated for purposes of transport, or turning or similar operation.

Other objects and advantages of this invention will appear from the following description taken in conjunction with the accompanying drawings which illustrate one embodiment of the invention merely by way of example.

Figure 1:
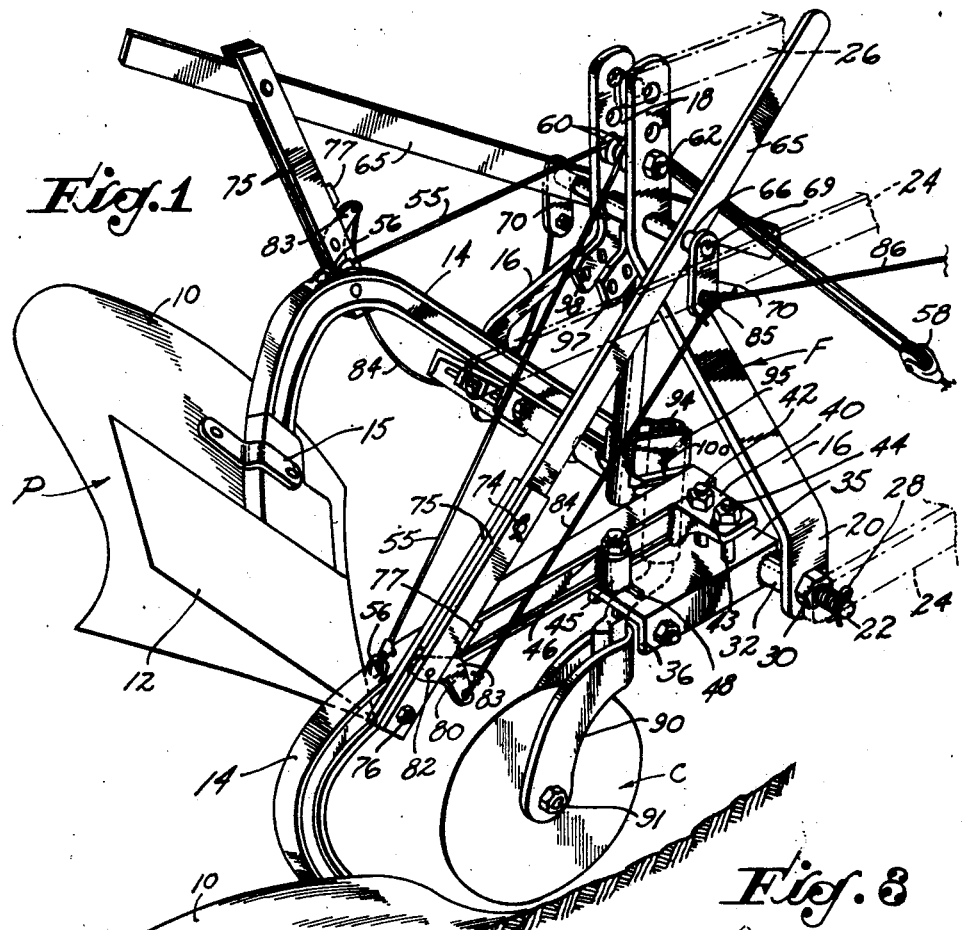
Fig. 1 is a perspective view of a plow structure embodying our invention and adapted to be carried by a standard type of supporting and elevating mechanism employed on tractors for such purposes, some of the relationships being exaggerated to show some of the parts.

The plowing structure as shown in the drawings possesses principally two plow bottoms P and associated actuating mechanism, a supporting framework F adapted to be in turn supported by a tractor or similar vehicle, and a colter disk C with associated supporting and adjusting mechanism.

Each of the plow bottoms P is of conventional construction and comprises a mold-board 10 and a land-side 12, and to each of these plow bottoms P a supporting plow beam 14 is secured by conventional means 15. The forward ends of the plow beams 14 are connected to and supported by a triangular framework F commonly known as an A-frame, which comprises a pair of suitably shaped bars or side members 16 whose intermediate portions are inclined, as shown, and extend upwardly to form spaced parallel upper portions 18 suitably connected as hereinafter disclosed. The lower extremities of the bars 16 are directed downward to provide brackets 20 in which are mounted the opposite ends of a transverse supporting shaft 22 whose extremities are adapted to engage the rear ends of corresponding supporting and elevating arms 24 carried by a relatively low rear portion 25 of a tractor, upon which tractor the whole plow structure is supported and by which it is pulled. The upper end of the framework F is connected with another arm 26 which leads to the tractor and serves, together with the arms 24, to vary the position of the framework F and plow bottoms P by bodily raising and lowering the framework by a known type of hydraulic mechanism standard on many tractors.

The transverse supporting shaft 22 has means such as cotter pins 28 in its ends for maintaining the position of the supporting ends of the arms 24, each end of the shaft 22 also carrying a positioning and retaining nut 30, or the like, bearing against the bracket ends 20 of the frame members 16. Proper spacing of the bracket ends 20 is maintained by means of a pair of spacing sleeves 32 carried on opposite sides of the middle of the shaft 22 and a short middle sleeve 33 which abuts the ends of the sleeves 32 and serves to space the latter and maintain their opposite ends in proper bearing position against the brackets 20.

The sleeves 32 serve also as supports for the forward ends of the plow beams 14, and each supporting connection is obtained through the medium of a plate 35 in the form of a broad piece of channel iron whose flat face is normally directed upward and whose flanges 36 are normally directed downward. The forward ends of the flanges 36 are fixedly secured as by welding to their respective sleeves 32 whereby each plate is swingingly mounted upon the transverse shaft 22. Upon the inner side of the top of each plate 35, the forward end of the adjacent plow beam 14 is adjustably mounted. This mounting is accomplished by means of a bracket 40 which is welded to the outer side of the forward end of the corresponding plow beam 14 which is in the form of an I-beam having a thick web and shallow channels. The bracket 40 is provided near its inner end with a hole which receives a retaining bolt 42 passing through a corresponding hole in the plate 35 by which the corresponding beam 14 and bracket 40 are bolted to the respective plate. The outer end of the bracket 40 is provided with a slot 43 which receives a bolt 44 which also passes through a hole in the plate 35. At a position on each plow beam 14 adjacent the rear end of the plate 35, an eye 45 is welded to the side of the beam 14 through which eye passes a bolt 46 that extends through a slot 48 in the plate 35, the lower end of the bolt being welded to a piece of narrow channel iron 49 which is adjustably retained between the flanges 36 of the plate 35 by means of adjusting screws 50 welded to the channel iron 49 and extending through the flanges 36 and retained in adjusted position by nuts 52. By means of this mounting, each plow beam 14 may be swung slightly from side to side by reason of the movement of the bolts 44 and 46 in the slots 43 and 48, respectively, in order to adjust the position of each plow beam 14 and its plow bottom P as desired. Thereupon, each of the bolts 42 and 44 is tightened by means of nuts respectively mounted thereon, the nuts 52 upon the screws 50 being tightened to retain the channel iron 49 in adjusted position, the channel iron 49 being drawn up tight against the supporting plate 35, if desired, by a nut 53 on the bolt 46. By means of the mounting described, the plow bottoms P and their beams 14 may be raised and lowered about the axis of the supporting shaft 22.

The plow bottoms P are adapted to be raised and lowered selectively and simultaneously by means of a flexible cable 55 whose ends are secured to loops 56 which may be welded to the outer portions of the plow beams 14. The middle portion of the cable 55 passes through a pulley 58 connected through means of a suitable clevis 59 to the rear portion 25 of the tractor, and the intermediate portions are passed over pulleys 60 carried on a bolt 62 between the upper ends 18 of the frame members 16. Thus, as one plow bottom P and its supporting beam 14 are swung about the supporting shaft 22 for raising and lowering, the other plow bottom P and its beam 14 are simultaneously moved oppositely, the two plow bottoms thereby counterbalancing each other.

Each plow bottom P is both braced at operative position and adapted to be elevated into inoperative position by means of a jointed lever and brace comprising a lever arm or section 65 fulcrumed at 66 on a rock shaft 68 on each of whose outer ends there is welded or otherwise secured at 69 a depending arm 70 whose function is presently to be described. This rock shaft passes through the frame members 16 and is positioned by means of a plurality of sleeves, of which an outer pair 72 on each end serves to position the respective lever arm 65 and a middle sleeve 73 serves to space the upper ends 18 of the frame members 16. The forward end of each lever arm 65 is free and is adapted to be manipulated by the operator, the opposite end being pivoted at 74 to a shorter section 75 consisting of two spaced bars pivoted at 76 to the adjacent plow beam 14. When one of the jointed levers 65, 75 is in the straight, bracing position as seen at the right of Fig. 1, the lower end of the lever arm 65 below the pivot point 74 swings between the two spaced bars of the shorter section 75 into a position slightly past dead center, in which position it is retained by means of a stop 77 in the form of a short cross piece secured to the under sides of the bars 75. When in this position, the jointed lever serves to brace the respective plow beam 14 and hold the plow bottom P in properly depressed, operative position, the weight of the parts tending to maintain this position.

For purposes of elevating one of the plow bottoms P and its plow beam 14 from operative position, the free end of the respective lever bar 65 is depressed to break the joint between the two sections 65 and 75, whereby continued motion of the lever arm 65 elevates the corresponding plow bottom P to the position shown at the left of Fig. 1, in which position the jointed lever 65, 75 assumes an angular position. This changing of the plow bottoms from operative to inoperative position is accomplished relatively easily by reason of the fact that the two plow bottoms P and their beams 14 counterbalance themselves through the medium of the flexible cable 55. To facilitate breaking of the joint when the jointed lever 65, 75 is in bracing position, a latch member 80 is provided which is pivoted at 82 between the bars 75 and has a heel 83 adapted to strike the lowermost corner of the lower end of the lever arm 65, this heel 83 being adapted to force the lower end of the lever arm 65 out of its position past dead center and to break the joint, this movement being effected through the medium of a draft line 84 secured to an eye 85 on the lower end of the adjacent arm 70 secured to the rock shaft 68. The arm 70, the rock shaft 68, and each draft line 84 when taut are actuated through the medium of another draft line 86 which leads to a driver's position on the tractor. When the driver jerks or pulls the line 86, it actuates the arm 70 and the rock shaft 68 and causes that line 84 which is taut to actuate its latch 80 and dislodge the lower end of the corresponding lever arm 65, thereby initiating the elevation of the corresponding plow bottom P and plow beam 14, which operation is completed by manipulation of the forward end of the lever arm 65.

As the plow bottoms P and their plow beams 14 are moved to and from their operative positions, the colter disk C is automatically shifted from one side to the other so that it will be almost directly aligned with the leading point of the plow bottom P which is in operating position, whereby the colter C may slice the earth in advance of the plow bottom, in order that the respective land-side 12 may follow along one face of the cut so made while the corresponding moldboard 10 turns a furrow. The automatic shifting of the colter disk C is effected by forcing the same from one side to the other by a cam action produced by raising one plow beam 14 and lowering the other plow beam 14. To attain this result, the colter disk C is set rearward toward the points of the plow bottoms P by two arms 90 between which the disk is journaled at 91. The arms 90 are rigidly secured on the lower end of a bent bracket 92 whose upper end is adjustably secured by a set screw 93 in an upright socket 94 held against the forward side of the sleeve 33 on the shaft 22 by small tie plates 95 and an upstanding post 96, the plates 95 having their forward ends welded to the sides of the socket 94 and their rearward ends welded to the opposite sides of the post 96 whose lower end bears against the rearward side of the sleeve 33, thereby providing a loose mounting of the socket 94 and post 96 on the shaft 22. The upper end of the post 96 is adjustably positioned between two rack bars 97 welded to the adjacent inner faces of the A-frame bars 16 and provided with rows of openings 98 which adjustably receive a pin or bolt 99 passing through the upper end of the post 96. Thus, the upper end of the post 96 may be moved backward and forward to swing the colter disk C backward and forward in order to adjust its spacing with respect to the points of the plow bottoms P.

Figure 8:
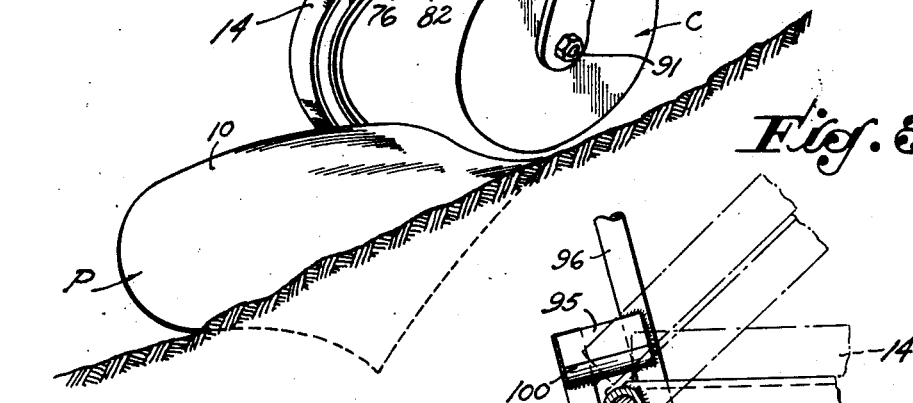
Fig. 8 is a schematic detail indicating the relation of various cam means with the plow beams in different positions.
Figure 7:
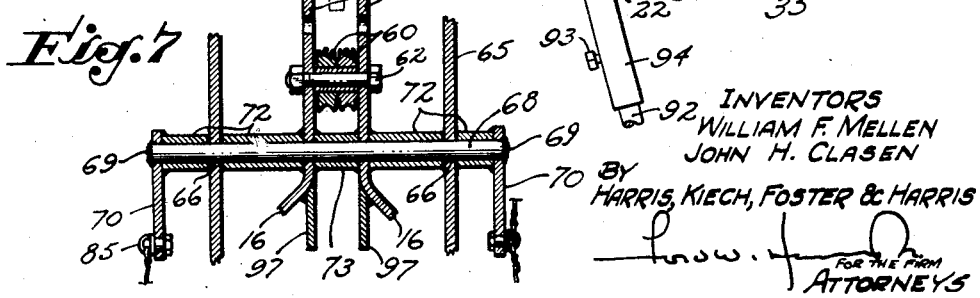
Fig. 7 is a fragmentary vertical section taken on the line 7—7 of Fig. 2.

On the lower edge of each tie plate 95, an offset cam member 100 is fixedly secured either by being integrally formed or by being welded to the respective plate 95. These cam members 100 are in the form of laterally projecting cam blocks or cam shoes whose under portions are curved to form cam faces 102 that are inclined upwardly and outwardly and are adapted to be engaged by laterally projecting cam edges 35a which are the inner upper edges of the supporting plates 35 and which extend beyond the inner edges of the plow beams 14 carried thereon. In general, the cam members 100 are horizontally disposed so that their inner edges may engage the thick webs of the I-beams 14. These members 100, however, may have a slight upward inclination toward the rear, that is, toward the plow bottoms P to facilitate the cam action, and this may be in addition to such inclination as is given them by adjusting the position of the upper end of the post 96; see Figs. 1 and 8. The relationship of these parts is shown in the perspective view of Fig. 1 in a somewhat distorted manner in order to bring out the general arrangement more fully.

Thus, by the means described, the colter disk C may be manually adjusted backward and forward by varying the position of the upper end of the post 96 between the rack bars 97, and, also, the colter disk C will be automatically shifted laterally by the cam devices 35a and 100 in order to dispose the disk C selectively in front of the points of the respective plow bottoms P.

*Operation*

In operating the present construction, the A-frame F is actuated from a supporting tractor, as by means of a conventional hydraulic device, through the medium of the supporting arms 24 and 26 to elevate the plow bottoms P as a unit for purposes of transportation and for lowering them in preparation for plowing. During these movements, the plow bottoms P may have been set through the medium of the lever arms 65 in positions somewhat intermediate between those illustrated.

For plowing purposes, one of the lever arms 65 is manipulated to lower the corresponding plow bottom into operative position by straightening the jointed lever 65, 75 and locking it past dead center at the pivot 74, as seen near the right side of Fig. 1. During this movement the cable 55 causes elevation of the other plow bottom to the position shown. In these positions, the one lever acts as a brace to hold the lowered plow bottom in operating location. To reverse the positions of the plow bottoms, that lever joint which is locked past its dead center is broken by jerking the line 86 and causing the heel 83 of the latch 80 to kick the lower end of the lever arm 65 out of its position past dead center where it bears against the stop 77. The free end of the lever arm 65 is then depressed by the tractor driver, this operation being comparatively simple owing to the fact that the other plow bottom P is in counterbalancing relation through the medium of the cable 55 and tends to assist the lifting operation. Again, either plow bottom P may be lifted by a continued pull on the cable 86 without manual operation of the lever arm 65.

The colter disk C is shifted laterally as each plow beam 14 is raised to elevated position, by reason of the fact that the edge 35a of the plate 35 supporting the respective plow beam 14 engages the cam face 102 of the adjacent cam shoe 100, the simultaneous lowering of the opposite plow beam 14 causing the corresponding edge 35a of the respective plate 35 to disengage the opposite cam shoe 100. Thus, the rising cam edge 35a forces both of the cam shoes 100 toward the opposite plow beam 14, the post 96 and the socket 94 being thereby shifted along the sleeve 33 carried by the transverse shaft 22, with the result that the colter disk C is correspondingly shifted. When the one plow beam 14 has reached its elevated position and the other plow beam 14 has reached its lowered operative position, the elevated cam edge 35a, by reason of its engagement with the contiguous edge of the adjacent cam shoe 100, holds the horizontal edge of the opposite cam shoe 100 against the web of the opposite plow beam 14.

When a plow beam 14 is in its lowered operative position, there is an appreciable clearance between its cam edge 35a and the cam face 102 on the under side of the adjacent cam shoe 100. This spacing permits a limited amount of initial upward movement of the plow beam before cam action commences, and also permits an appreciable amount of downward movement after disengagement of the corresponding cam surfaces 35a and 102 in order to permit shifting of the cam shoe 100 toward the adjacent plow beam by the opposite plow beam when it is being elevated.

The lateral shift given to the socket member 94 by the cam action of one of the cam edges 35a against the adjacent cam shoe 100, as described, is imparted to the colter disk C to an increased extent by reason of the pivotal movement of the post 96, the socket 94, and the bracket arms 90 about a loose connection of the post 96 on the adjusting bolt 99 in the rack bars 97. Total movement, which amounts to about two inches, is all that is required to move the disk C from alignment with the point of one land-side 12 of one of the plow bottoms P into alignment with the point of the other land-side 12.

The plow beams 14 and the points of the landsides 12 of the plow bottoms P may be tilted to a limited extent, by means of the adjusting bolts 44 and 46. By tightening the bolt 44 on each plate 35 in order to tip the outer end of the bracket 40, the plow beam 14 on a respective plate 35 may be tipped somewhat in order to tip its plow bottom P. In order that the plow bottoms P may be swung transversely into suitable operating position, the bolts 46 will be loosened and the plow beams 14 adjusted, the bolts 46 then being tightened to retain the adjustment. Inasmuch as a sufficient amount of space must be left on the inner edges of the plate 35 to provide for adjustment of the rearward portions of the beams 14, the inner edges 35a are spaced inwardly from the forward end portions of the plow beams 14 sufficiently to leave them clear of obstruction in order that they may perform their cam functions in cooperation with the cam shoes 100.

Figure 2:
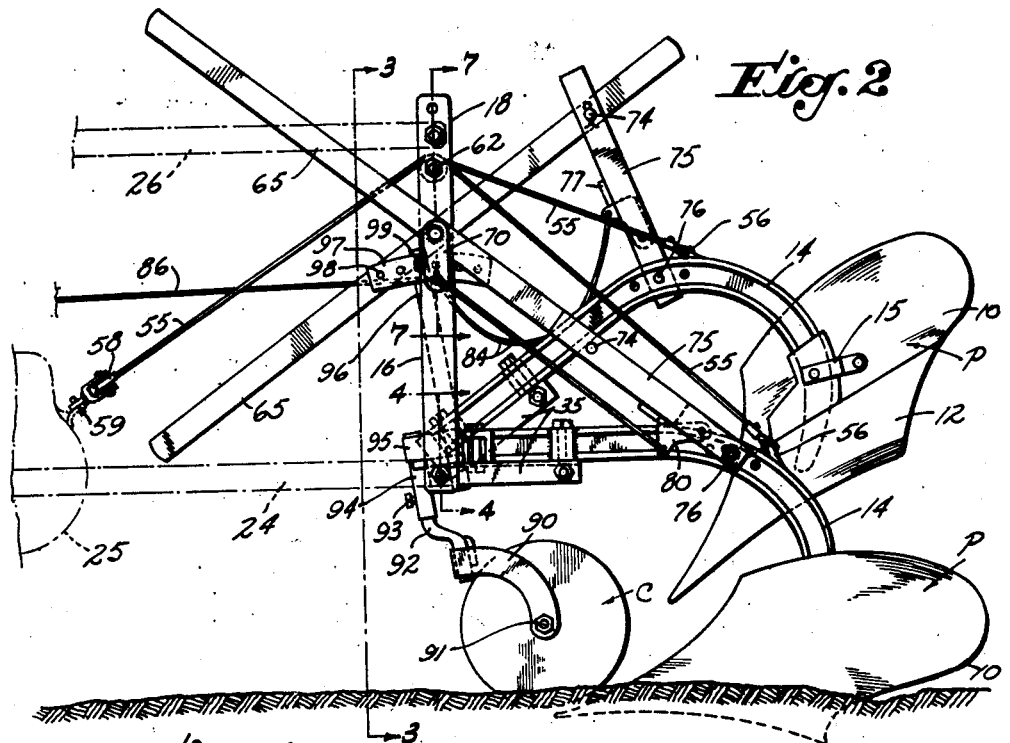
Fig. 2 is a side elevation of the structure of Fig. 1 taken from the opposite side as seen in Fig. 1, the relative positions of the plow bottoms being reversed.
Figures 3, 4, 5:
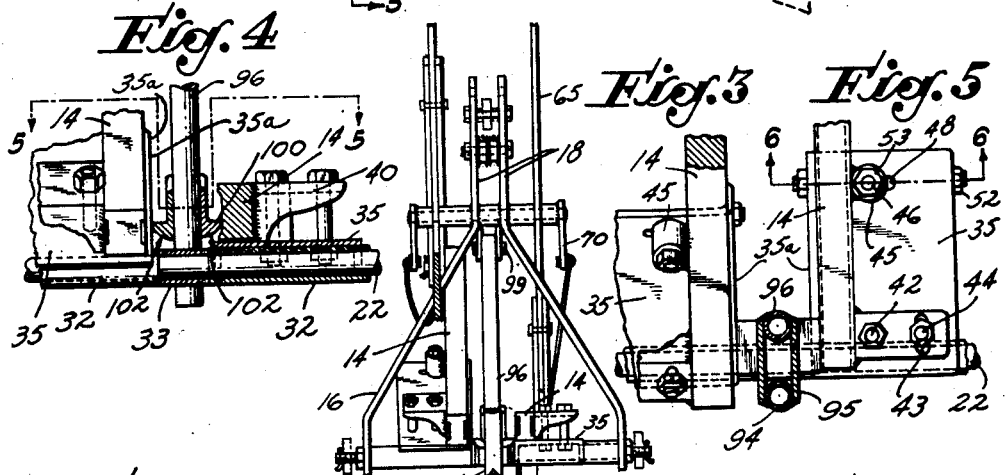
Fig. 3 is a front elevation taken approximately from the line 3—3 of Fig. 2, a forward portion of an operating arm being broken away, and one plow bottom being omitted.
Fig. 4 is a fragmentary vertical sectional detail taken approximately from the line 4—4 of Fig. 2.
Fig. 5 is a fragmentary plan taken approximately from the line 5—5 of Fig. 4, portions being shown in section.
Figure 6:
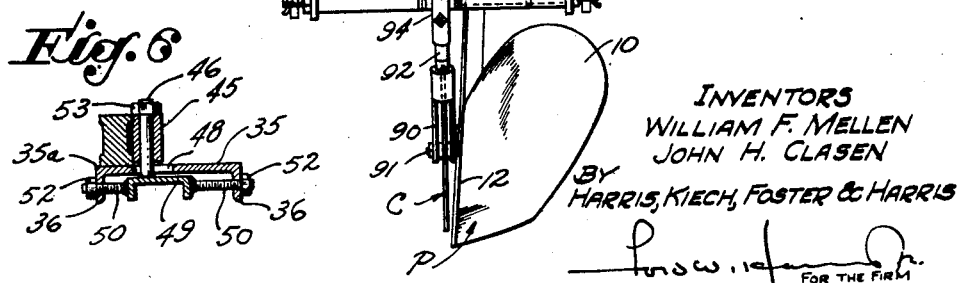
Fig. 6 is a fragmentary vertical section taken on the line 6—6 of Fig. 5.

For purposes of transporting the plow structure of the present invention to and from plowing locations, the entire A-frame F and the plow bottoms P and associated mechanism supported thereby will ordinarily be bodily elevated through the medium of a hydraulic lifting mechanism or other actuating mechanism employed as standard equipment upon various tractors. When such transportation is to be undertaken, and one of the plow bottoms P is in operative plowing position, as shown in Figs. 1 and 2, elevation of the A-frame F will serve to lift the lowered plow bottom P directly from its position in the soil being cultivated. However, as the frame F is lifted, the two strands of the cable 55 are pulled through the frame and over the pulleys 60 by reason of the fixed connection of the pulley 58 to the rear portion 25 of the tractor. As a result, either the elevated plow bottom P is raised to a higher position, or the lower plow bottom P is raised somewhat, or a limited amount of both actions occurs. Such elevation by reason of the effective shortening of the ends of the cable 55 attached to the plow beams 14 is permitted by reason of the limited amount of upward motion of the respective cam edge 35a before coming into contact with the adjacent cam face 102 of the respective cam shoe 100. The resultant play between these parts is such as to permit the incidental elevation of one or both of the plow bottoms P as the A-frame F is raised, without any conflicting, opposing action of the two cam edges 35a against their respective cam shoes 100.

Many modifications will become apparent to those skilled in the art, and it is intended to reserve all such variations as fall within the scope of the appended claims.

We claim as our invention:

1. In combination in a soil cultivating structure: two earth-working devices; supporting means for said devices; means whereby said devices may be selectively moved to and from operative positions; a movable auxiliary soil-penetrating tool carried by said supporting means; and means connected with said devices for automatically shifting the position of said tool with respect to said devices as the latter are selectively moved.

2. In combination in a plowing structure: two oppositely pitched plow bottoms; supporting means for said plow bottoms; means whereby said plow bottoms may be selectively raised and lowered from and to operative positions; a movable auxiliary soil-cutting device carried by said supporting means; and means connected with said plow bottoms for automatically shifting the position of said auxiliary device laterally into alignment with one of said plow bottoms as the latter is lowered.

3. A plowing structure according to claim 2 wherein said shifting means comprises cam means carried respectively by said plow bottoms and by said soil-cutting device for shifting the latter.

4. A combination according to claim 2 wherein said auxiliary device is carried forward of said plow bottoms when in operative position, and means for adjusting said auxiliary device backward and forward with respect to said plow bottoms when in operative position.

5. In combination in a plowing structure: a supporting frame; a transverse supporting member carried by said frame; plow beams carried by said transverse member and adapted to be raised and lowered to and from operative positions; two oppositely pitched plow bottoms carried by said plow beams; a colter; and colter supporting means mounted upon said transverse member and adapted to be shifted laterally along said transverse member for aligning the colter with a plow bottom.

6. A combination according to claim 5 wherein said colter supporting means is disposed in an upstanding position and has an upper end mounted to be adjusted forwardly and rearwardly.

7. A combination according to claim 5 wherein said plow beams and said colter supporting means are provided with cooperative cam devices whereby the colter is shifted transversely as said plow bottoms are raised and lowered.

8. In combination in a plow structure: two oppositely pitched plow bottoms; a supporting framework for said plow bottoms; plow beams pivotally mounted upon said framework and carrying said plow bottoms; means connecting said plow bottoms in counterbalanced relation whereby the plow bottoms may be selectively raised and lowered simultaneously from and to their operative positions; cam means connected with the plow beams adjacent opposing sides; a colter; means supporting said colter, said supporting means being disposed between said plow beams; and cam means on said supporting means adapted to be selectively engaged by the cam means connected with said plow beams for shifting said colter and said colter supporting means as said plow beams are raised and lowered.

9. A two-way plow structure comprising: two oppositely pitched plow bottoms; a supporting structure carrying said plow bottoms, said supporting structure and said plow bottoms being adapted to be bodily raised as a unit; means connecting said plow bottoms for simultaneously raising one plow bottom from operative position as the other is lowered into operative position; and control means for causing the lowered plow bottom to be elevated into inoperative position while the elevated plow bottom is retained in inoperative position when said supporting structure and plow bottoms are bodily raised as a unit.

10. A structure according to claim 9 wherein said connecting means includes a relatively elevated guide means and a looped cable leading to said guide means and connecting said plow bottoms in counterbalanced relation, and said control means is a relatively fixed pulley at an effectively lower position around which pulley said looped cable extends.

11. A two-way plow comprising: two oppositely pitched plow bottoms; a supporting structure carrying said plow bottoms, said supporting structure and said plow bottoms being adapted to be bodily raised as a unit; means for selectively raising and lowering said plow bottoms; and control means for causing the lowered plow bottom to be elevated into inoperative position while the elevated plow bottom is retained in inoperative position when said supporting structure and said plow bottoms are bodily raised as a unit.

12. A two-way plow according to claim 11, including: a single colter adapted to be aligned selectively with either plow bottom; and means for automatically shifting said colter from alignment with one plow bottom into alignment with the other plow bottom as said plow bottoms are selectively raised and lowered.

WILLIAM FISK MELLEN.
JOHN H. CLASEN.